United States Patent
Weigel

(10) Patent No.: US 9,518,697 B1
(45) Date of Patent: Dec. 13, 2016

(54) APPARATUS AND METHODS FOR SUSPENDING A TOOL

(71) Applicant: The Boeing Company, Chicago, IL (US)

(72) Inventor: Matthew Joseph Weigel, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 13/920,752

(22) Filed: Jun. 18, 2013

(51) Int. Cl.
| | |
|---|---|
| A47H 1/10 | (2006.01) |
| F16M 13/02 | (2006.01) |
| F16M 13/00 | (2006.01) |
| E21F 17/02 | (2006.01) |
| F16L 3/00 | (2006.01) |
| F16L 3/08 | (2006.01) |
| B42F 13/00 | (2006.01) |
| B66C 1/00 | (2006.01) |
| B25B 1/22 | (2006.01) |
| B43L 5/00 | (2006.01) |
| A47F 5/00 | (2006.01) |
| B66C 1/28 | (2006.01) |
| B25H 1/00 | (2006.01) |
| B66C 1/24 | (2006.01) |

(52) U.S. Cl.
CPC ............ F16M 13/022 (2013.01); F16M 13/00 (2013.01); *A47F 5/0006* (2013.01); *B25H 1/00* (2013.01); *B25H 1/0007* (2013.01); *B66C 1/24* (2013.01); *B66C 1/28* (2013.01); *F16M 13/027* (2013.01)

(58) Field of Classification Search
CPC ................. F16L 3/00; F16L 3/02; F16L 3/04; F16L 3/1041; B25H 1/00; B25H 1/0007; B66C 1/24; B66C 1/28; A47F 5/0006; F16M 13/00; F16M 13/022; F16M 13/027
USPC ... 248/58, 62, 67.7, 72, 74.4, 342, 317, 323; 294/16, 31.2, 119.2, 81.1, 81.2, 81.3, 294/67.21; 269/71, 53, 54.1, 87.2, 87.3, 256
See application file for complete search history.

(56) References Cited

U.S. PATENT DOCUMENTS

| | | | | |
|---|---|---|---|---|
| 806,192 | A * | 12/1905 | Russell ..................... | F16L 3/14 248/59 |
| 1,986,861 | A * | 1/1935 | Starr ............................... | 248/62 |
| 2,603,523 | A * | 7/1952 | Cameron .................. | B66C 1/18 294/74 |
| 3,343,862 | A * | 9/1967 | Holmes ..................... | B66C 1/18 24/134 R |
| 3,429,535 | A * | 2/1969 | Herzig ........................... | 248/58 |
| 3,430,909 | A * | 3/1969 | McCann ................... | B66C 1/00 248/317 |
| 3,508,730 | A * | 4/1970 | Knezo, Jr. ....................... | 248/73 |

(Continued)

*Primary Examiner* — Brian Mattei
*Assistant Examiner* — Taylor Morris
(74) *Attorney, Agent, or Firm* — Kwan & Olynick LLP

(57) ABSTRACT

Apparatus and methods for suspending a tool from a support arm having a mounting location are disclosed. The tool has a virtual work axis and a center of gravity. The apparatus may include a tool holder and a mounting interface located between the support arm and the tool holder. The mounting interface extends substantially along the virtual work axis. Selectable locations, configured to enable adjustable engagement of the support arm and/or the tool holder with the mounting interface, are part of or otherwise associated with the mounting interface. The center of gravity of the tool may be positioned below the mounting location using the selectable locations such that the tool is supported in a selected attitude or orientation.

21 Claims, 7 Drawing Sheets

(56) References Cited

U.S. PATENT DOCUMENTS

| | | | | |
|---|---|---|---|---|
| 3,781,054 | A * | 12/1973 | Cole | B66C 1/62 |
| | | | | 294/81.3 |
| 4,039,087 | A * | 8/1977 | Sandvick, Sr. | 29/237 |
| 4,239,196 | A * | 12/1980 | Hanger | 269/17 |
| 4,957,251 | A * | 9/1990 | Hubbard | 248/68.1 |
| 5,085,384 | A * | 2/1992 | Kasubke | 248/62 |
| 5,105,907 | A * | 4/1992 | Lebow | 182/3 |
| 6,062,620 | A * | 5/2000 | Walker | B66C 1/28 |
| | | | | 294/67.31 |
| 6,092,850 | A * | 7/2000 | Quigley | B66C 1/62 |
| | | | | 294/103.1 |
| 6,102,351 | A * | 8/2000 | Akrep | A63J 99/00 |
| | | | | 248/324 |
| 6,932,313 | B1 * | 8/2005 | Akrep | B66C 1/10 |
| | | | | 248/324 |
| 7,048,439 | B2 | 5/2006 | Hubner et al. | |
| 7,250,761 | B1 | 7/2007 | Marchione | |
| 7,950,709 | B1 * | 5/2011 | Cheney | B66C 1/427 |
| | | | | 294/103.1 |
| 2005/0167558 | A1 * | 8/2005 | Smith | F16M 11/06 |
| | | | | 248/317 |
| 2007/0296229 | A1 * | 12/2007 | Chauvin | B66C 1/10 |
| | | | | 294/81.61 |
| 2010/0288894 | A1 * | 11/2010 | Hopkins | H02G 3/32 |
| | | | | 248/220.21 |
| 2010/0301178 | A1 * | 12/2010 | Myers | 248/74.1 |
| 2012/0286119 | A1 * | 11/2012 | Scott | B25B 27/16 |
| | | | | 248/309.1 |

\* cited by examiner

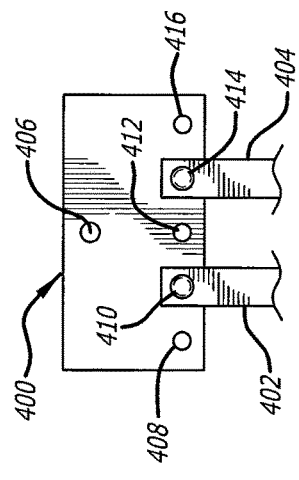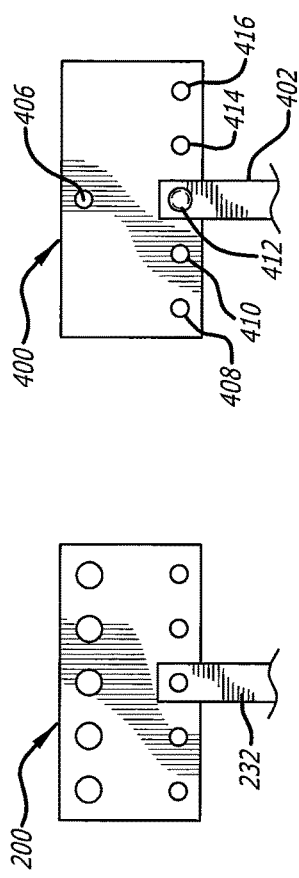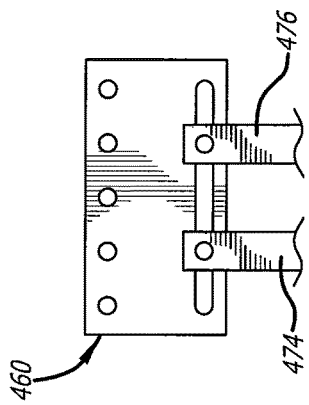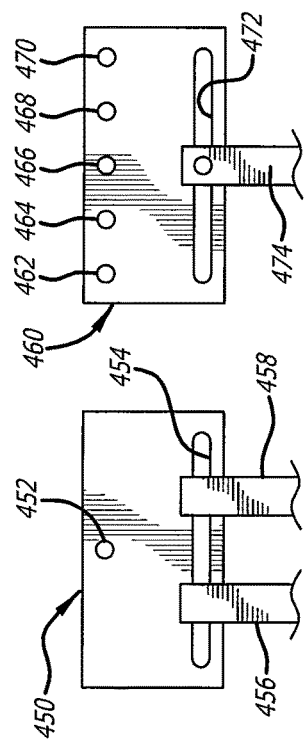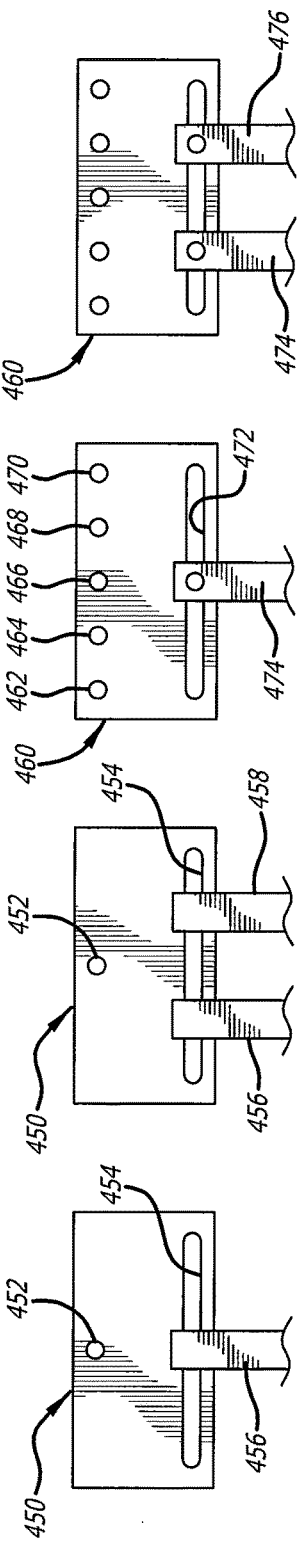

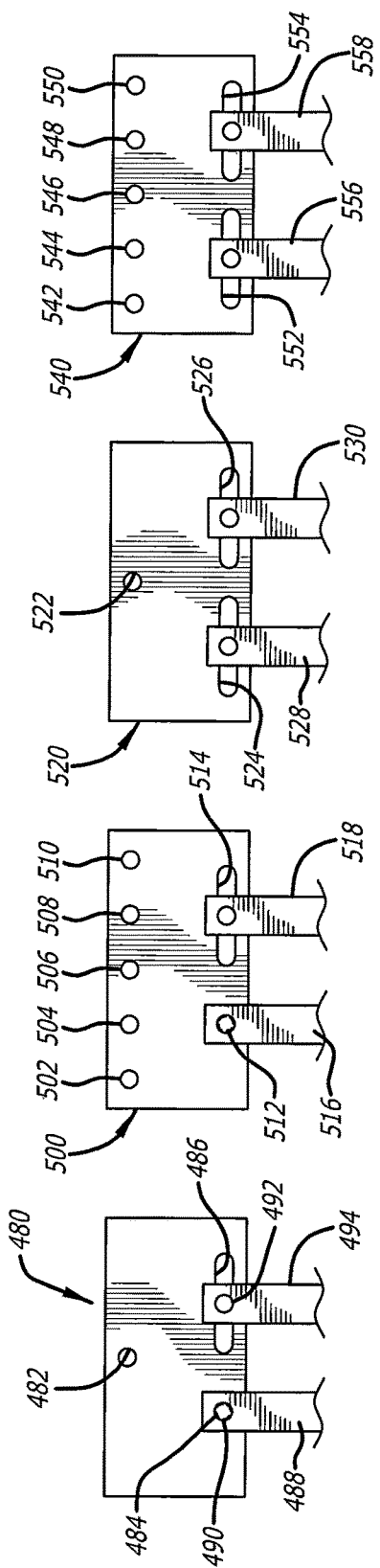

APPARATUS AND METHODS FOR SUSPENDING A TOOL

BACKGROUND

Tools for processing a workpiece may be positioned in a location relative to the workpiece for operation by a worker. In some environments, such as that of manufacturing aircraft structures, a tool may be held by a support arm, such as a counterbalance device. While commercially available support arms may permit the tool to be generally positioned in the required location relative to the workpiece, they do not ensure that the tool be suspended in a desired orientation or attitude relative to the support arm. Undesirable tool orientations may be distracting to a worker engaged in manufacturing, maintenance, repair, inspection, and other operations. These distractions may include inconvenience in operation, associated fatigue, and other unwanted effects.

In addition to ergonomics aspects discussed above, properly securing the tool to the support arm has proven to be problematic, since clamps and other commercially available holding devices may be ineffective at securely holding the tool, or may damage the tool.

SUMMARY

Apparatus and methods for securely suspending a tool from a support arm in a selected orientation relative thereto are disclosed.

One aspect of the disclosure relates to an apparatus for suspending a tool from a support arm. The apparatus includes a tool holder, a mounting interface extending substantially along a virtual work axis of the tool, and selectable locations associated with the mounting interface. The selectable locations are configured to enable adjustable engagement of at least one of the support arm or the tool holder with the mounting interface.

Another aspect of the disclosure relates to a method of suspending a tool, having a center of gravity, from a support arm having a mounting location. The method includes coupling the tool to the support arm and horizontally adjusting the center of gravity of the tool relative to the mounting location of the support arm.

BRIEF DESCRIPTION OF THE DRAWINGS

Reference will now be made to the drawings, which are not necessarily drawn to scale, and wherein like reference characters designate the same or similar parts throughout the several views, and wherein:

FIG. 14 is a side elevational view of one example of an apparatus for suspending the tool illustrated in FIG. 3;

FIG. 15 is a side elevational view of one variant of an apparatus for suspending the tool illustrated in FIG. 3;

FIG. 16 is a side elevational view of one alternative of an apparatus for suspending the tool illustrated in FIG. 3;

FIG. 17 is a side elevational view of another example of an apparatus for suspending the tool illustrated in FIG. 3;

FIG. 18 is a side elevational view of another variant of an apparatus for suspending the tool illustrated in FIG. 3;

FIG. 19 is a side elevational view of another alternative of an apparatus for suspending the tool illustrated in FIG. 3;

FIG. 20 is a side elevational view of yet another example of an apparatus for suspending the tool illustrated in FIG. 3;

FIG. 21 is a side elevational view of yet another variant of an apparatus for suspending the tool illustrated in FIG. 3;

FIG. 22 is a side elevational view of yet another alternative of an apparatus for suspending the tool illustrated in FIG. 3;

FIG. 23 is a side elevational view of still yet another example of an apparatus for suspending the tool illustrated in FIG. 3; and FIG. 24 is a side elevational view of still yet another variant of an apparatus for suspending the tool illustrated in FIG. 3.

DETAILED DESCRIPTION

Figure 1:
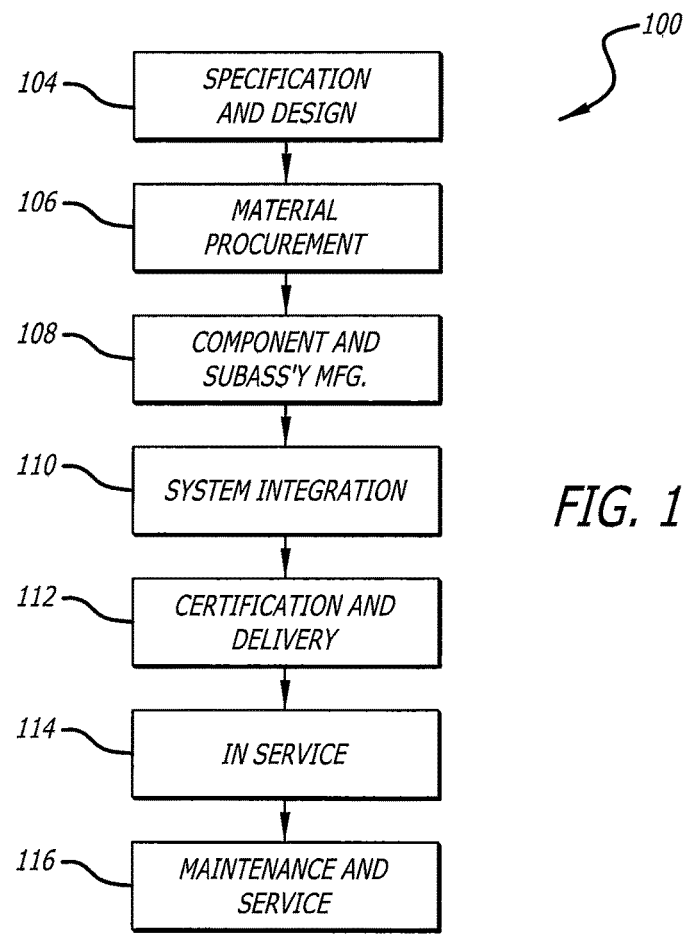
FIG. 1 is a flow diagram of aircraft production and service methodology.
Figure 2:
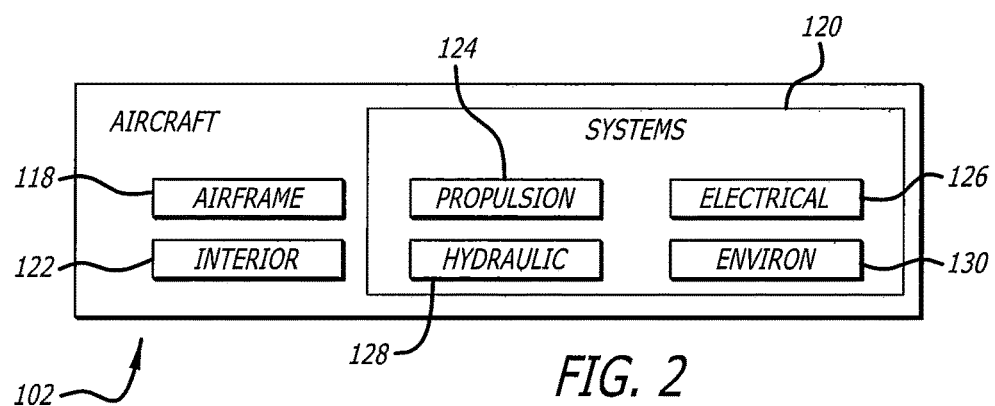
FIG. 2 is a block diagram of an aircraft.

Referring more particularly to the drawings, examples of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft takes place. Thereafter, the aircraft 102 may go through certification and delivery 112 in order to be placed into service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods shown or described herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more realizations of the apparatus, method, or combination thereof may be utilized during the production states 108 and 110, for example, by substantially expediting assembly of or reducing the cost of an aircraft 102. Similarly, one or more of apparatus or method realizations, or a combination thereof, may be utilized while the aircraft 102 is in service, for example and without limitation, to maintenance and service 116.

Figure 3:
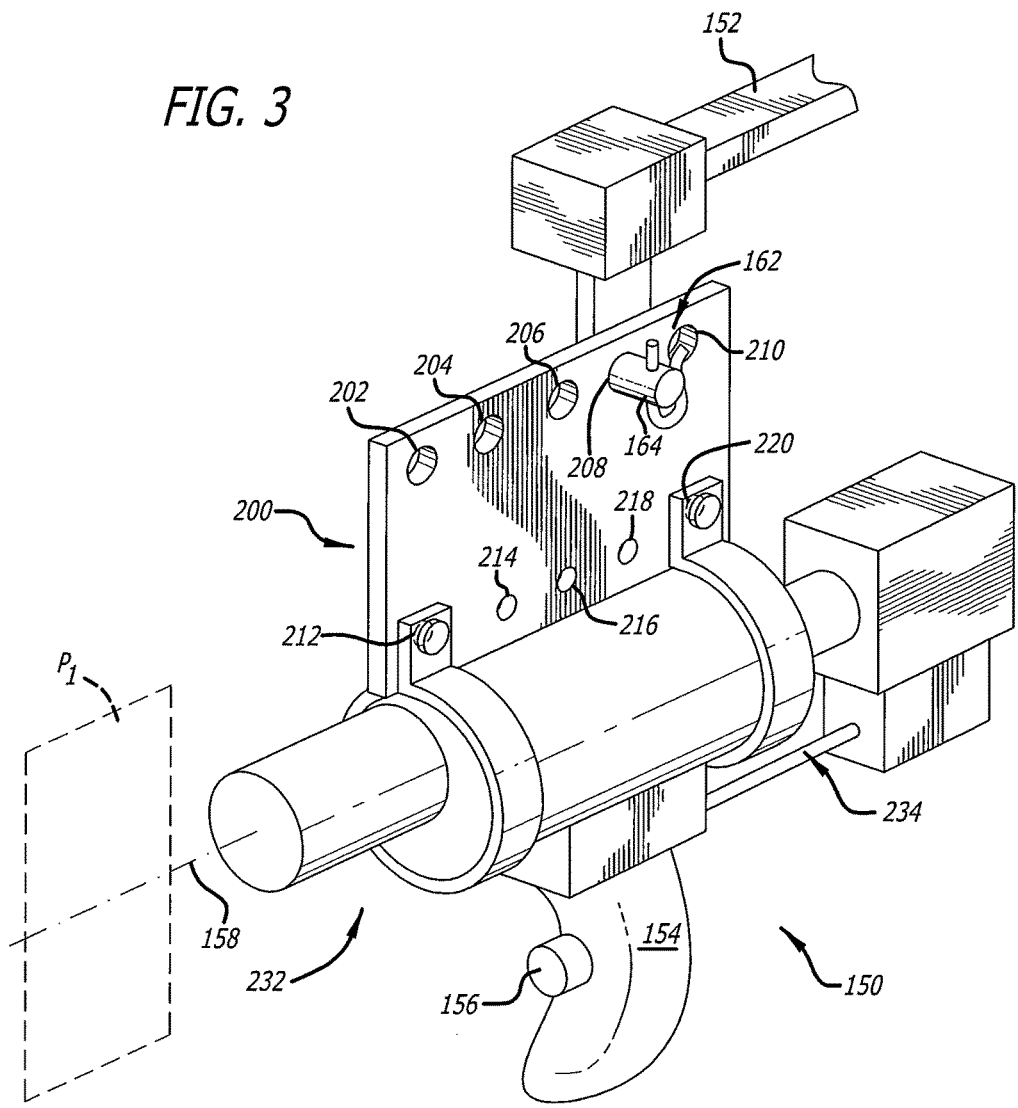
FIG. 3 is a perspective view of a tool suspended from a support arm, according to an aspect of the disclosure.
Figure 4:
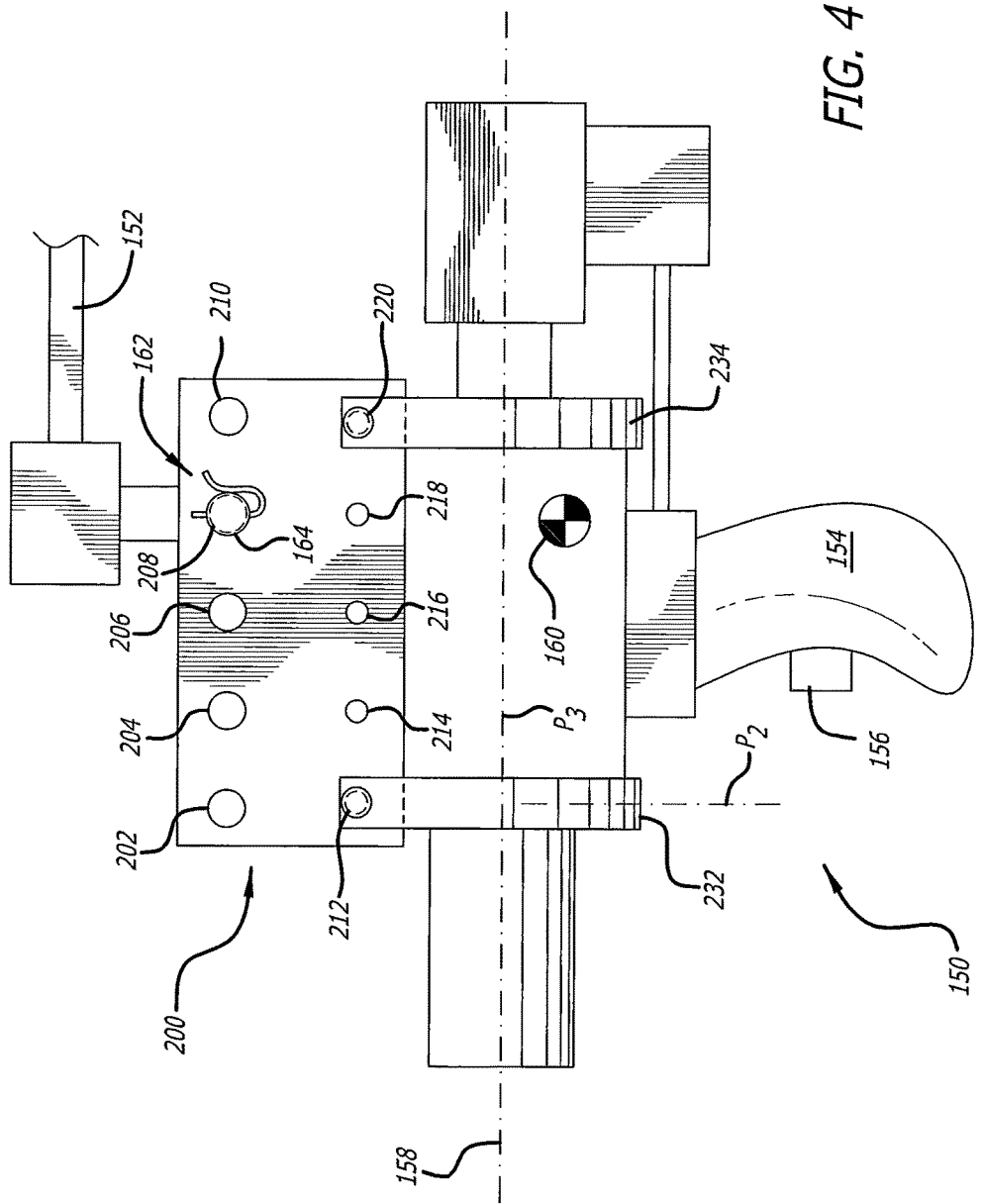
FIG. 4 is a side elevational view of the suspended tool illustrated in FIG. 3.

FIGS. 3 and 4 show a tool 150 suspended from a support arm 152, such as a counterbalance arm. The tool 150 may be suspended in a location allowing a worker to reach and maneuver the tool 150 to conduct manufacturing, maintenance, repair, and similar operations.

The tool 150 may be of the hand held type, having a handle 154 which may bear an operating control 156, such as a switch or a trigger. As used herein, a virtual work axis 158 is an axis along which the tool 150 brings an effect to bear on a workpiece (not shown). The tool 150 may be, for example, a rotary drive, such as a drill, wherein the virtual work axis 158 would be the axis of rotation of, e.g., a chuck or a nosepiece of the drill. In another example, the tool 150 may effect translation of a work element—for example, pushing, pulling, or reciprocating the work element. In this instance, the virtual work axis 158 would be an axis along which the work element is translated or reciprocated. The tool 150 may function in still other ways, such as ejecting matter. For example, the tool 150 may be a paint gun or a gun for spraying or otherwise discharging surface finishes, coatings, adhesives, lubricants, sealants, fasteners such as nails and rivets, friction pins, labels, and still other objects. In this case, the virtual work axis 158 would lie along the path of ejected matter. The tool 150 may emit energy, such as for welding, burning, curing, non-destructive heating, laser energy for imparting indicia to a surface, for use in aligning and other positioning operations, and illumination for working and inspecting, among other purposes. In the case of emission of energy, the virtual work axis 158 would lie along the path of emitted energy.

As shown in FIG. 4, the tool 150 has a center of gravity 160, the location of which relative to a mounting location 162 of the support arm 152 determines, at least in part, the attitude or orientation of the tool 150 with respect to the workpiece. In the present example, the mounting location 162 may be a cylindrical pin 164.

Figure 5:
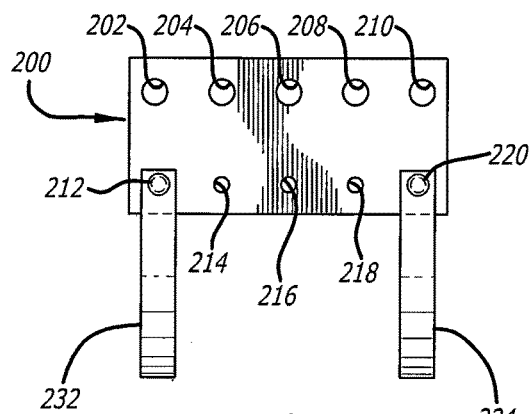
FIG. 5 is a side elevational view of an exemplary apparatus for suspending the tool illustrated in FIG. 3.
Figure 5A:
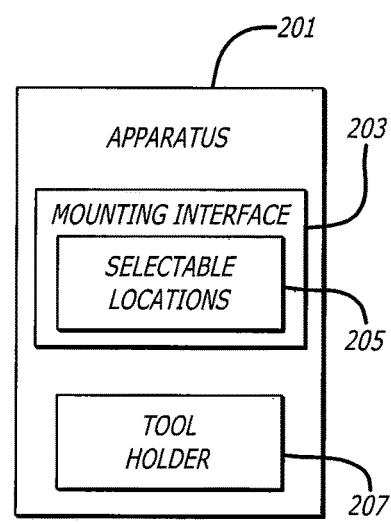
FIG. 5A is a block diagram of the apparatus illustrated in FIG. 5.

As illustrated schematically in FIG. 5A, a mounting interface 203 is provided to support a tool, such as the tool 150 shown in FIG. 3, in a selected orientation. The selected orientation may be with the virtual work axis 158 substantially horizontal, as shown in FIGS. 3 and 4.

FIG. 5A provides a conceptual overview of major components of an apparatus 201 for suspending a tool, such as the tool 150, from a support arm, such as the support arm 152. The apparatus 201 includes a tool holder 207 and the mounting interface 203. As illustrated in the example of FIGS. 3 and 4, the tool holder 207 is provided by two clamps 232, 234, or in the example of FIG. 10, a single clamp 320. Those skilled in the art will appreciate that the tool holder could take other forms. Referring back to FIG. 5A, the mounting interface 203 includes selectable locations 205 associated with the mounting interface 203. The selectable locations 205 enable adjustable engagement of at least one of the support arm 152 (FIG. 3) or the tool holder 207 with the mounting interface 203.

Still referring to FIG. 5A, the selectable locations 205 of the mounting interface 203 may include a plurality of openings, such as through holes 202, 204, 206, 208, 210, 212, 214, 216, 218, 220 of a mounting interface 200 illustrated in FIG. 5. The openings 202, 204, 206, 208, 210, 212, 214, 216, 218, 220 are perpendicular to a virtual vertical plane $P_1$ (FIG. 3), containing the virtual work axis 158.

Each one of the holes 202, 204, 206, 208, 210, located proximate the support arm 152 (FIG. 3), may provide a selectable location for engaging the support arm 152 with the mounting interface 200. Similarly, each one of the holes 212, 214, 216, 218, 220, located below the first arrangement of holes 202, 204, 206, 208, 210 when the mounting interface 200 is suspended from the support arm 152, may provide a selectable location for engaging a tool holder 207 (FIG. 5A), which holds the tool 150. The through holes 202, 204, 206, 208, 210 in the mounting interface 200 enable horizontal repositioning of the mounting interface 200 relative to a mounting location, such as the pin 164, illustrated in FIG. 3. This, in turn, enables a tool, such as the tool 150, to be suspended in an orientation such as that shown in FIG. 4, wherein the virtual work axis 158 is horizontal.

The mounting interface 200 is configured to be pivotally engaged by the support arm 152 so that the mounting interface 200 remains parallel to the virtual vertical plane $P_1$ (FIG. 3), containing the virtual work axis 158.

As used herein, orientational terms, such as vertical, horizontal, top, bottom, above, and below, refer to aspects of the disclosure as shown in the drawing figures, which depict their subject matter in orientations of normal use.

As illustrated in FIG. 3, a tool holder, which is an example of the tool holder 207 illustrated in FIG. 5A, may include two clamps 232, 234 configured to retain the tool 150. Each one of the holes 202, 204, 206, 208, 210 may be dimensioned and configured to receive the pin 164. Circular configuration of the holes 202, 204, 206, 208, 210 and the cylindrical configuration of the pin 164 cooperate to enable pivotal coupling of the support arm 152 to the mounting interface 200. More particularly, the mounting interface 200 may pivot in the virtual vertical plane $P_1$, containing the virtual work axis 158.

As employed herein, clamps, such as the clamps 232, 234, encompass not only devices which exert constant compressive force on an article being held or clamped thereby, but also devices that maintain grip on the article by mere encirclement or constraint established by a closely cooperating fit. The latter type of clamp may impose only incidental compressive forces on the clamped item due, for example, to the weight of the clamped item.

The selectable locations provided by the holes 202, 204, 206, 208, 210, 212, 214, 216, 218, 220 are arranged substantially along the virtual work axis 158 in that the group of holes 202, 204, 206, 208, 210 and the group of holes 212, 214, 216, 218, 220 are each arranged serially and parallel to the virtual work axis 158. It is not necessary that the holes 202, 204, 206, 208, or 210 be arrayed in a straight line or be spaced at similar intervals from one another. The same applies to the holes 212, 214, 216, 218, 220. Any of the holes 202, 204, 206, 208, or 210, or the holes 212, 214, 216, 218, 220 may be located at a different vertical distance above the virtual work axis 158 than other holes of its respective group of holes.

The mounting interface 200 is a plate, which extends substantially along the virtual work axis 158. In the example of FIGS. 3 and 4, at least one surface of the mounting interface 200 is parallel to the virtual vertical plane $P_1$, containing the virtual work axis 158. The holes 212, 214, 216, 218, 220 may enable the clamps 232, 234 to engage the mounting interface 200. Where only one clamp, such as the clamp 232, is utilized, a pivotal coupling, such as that between the pin 164 and any one of the holes 202, 204, 206, 208, 210, may occur between a clamp fastener (described in detail below) and the holes 212, 214, 216, 218, 220.

The holes 202, 204, 206, 208, 210, 212, 214, 216, 218, 220 may thus provide selectable locations for adjustably engaging at least one of the support arm 152 or the tool holder with the mounting interface 200.

Referring to FIG. 4, the mounting interface 200 and the clamps 232 and 234, which are respective variants of the mounting interface 203 and the tool holder 207 (illustrated in FIG. 5A) collectively provide an apparatus for suspending the tool 150 from the support arm 152. The mounting interface 203 is configured to be engaged by the tool holder 207 and the support arm 152 to enable the center of gravity 160 of the tool 150 to be selectively and adjustably locatable below the mounting location 162, e.g., in substantial vertical alignment therewith or in another geometric relationship, when the tool holder provided by the clamps 232, 234 retains the tool 150.

In one example, the selectable locations provided by the holes 202, 204, 206 208, 210, 212, 214, 216, 218, 220 are configured to enable the center of gravity 160 of the tool 150 to be selectively and adjustably positioned below the mounting location, i.e., the pin 164, in substantial vertical alignment therewith when the support arm 152 engages the mounting interface 200, and the tool holder provided by the clamps 232, 234 engages the tool 150 and the mounting interface 200. When the center of gravity 160 of the tool 150 is in substantial vertical alignment with the mounting location or pin 164, the tool will generally maintain its attitude, such as the substantially horizontal attitude depicted in FIG. 4, if not acted on by external forces.

Figure 6:
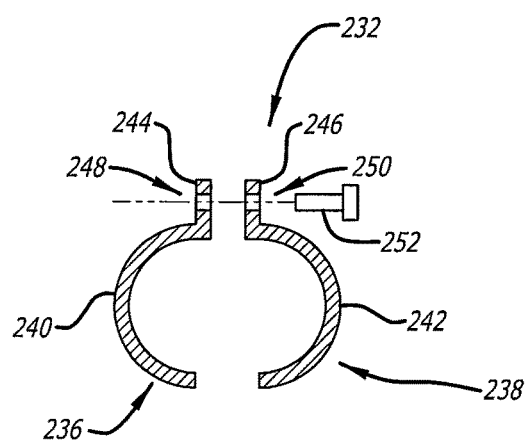
FIG. 6 is an end view of a tool holder of the apparatus illustrated in FIG. 5 according to one aspect of the disclosure.

The mounting interface 200 and the clamps 232 and 234 are illustrated in FIG. 5. FIG. 6 shows the clamp 232 detached from the mounting interface 200. As illustrated in FIG. 6, the clamp 232 may include two mirror-image, opposed sections or jaws 236, 238, including arcuate tool-contacting members 240, 242, respectively, which generally conform to the circumferential surface of the tool 150 and at least partially surround (i.e., not encircle completely) the tool 150.

Each tab 244 or 246 may have a respective hole 248 or 250 for receiving the shaft of a headed fastener 252. When the mounting interface 200 is sandwiched between the tabs 244, 246, inserting the fastener 252 through the holes 248, 250, and one of the holes 212-220 (e.g., FIG. 3) and securing the assembly using a nut (not shown) not only retains the tool 150 within the clamp 232, but also couples the clamp 232 to the mounting interface 200. The fastener 252 may be adequately tightened to lock the clamp 232 to the mounting interface or alternatively may be left sufficiently loose to pivotally secure the clamp 232 relative to the mounting interface 200.

Figure 7:
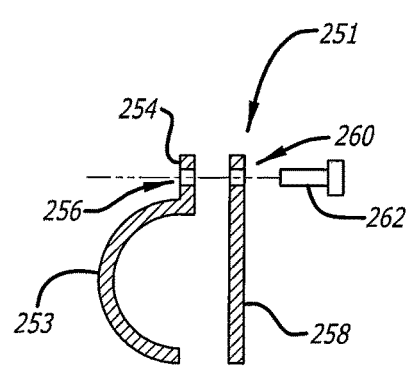
FIG. 7 is an end view of a tool holder of the apparatus illustrated in FIG. 5 according to another aspect of the disclosure.

Referring to FIG. 7, in another aspect of the disclosure, a clamp 251 may include an arcuate jaw 253 terminating in a tab 254 having a hole 256, and a straight jaw 258 having a hole 260. A fastener 262 may be inserted through the holes 256, 260 and also through an opening in a mounting interface, such as the mounting interface 200, for coupling the assembly together. The fastener 262 may require a nut (not shown), or alternatively may thread into one of the holes 256 or 260 (this option is not shown), or may be retained in any other suitable way. The clamp 251 may retain a tool without requiring engagement therewith around the full circumference of the tool. In another aspect of the disclosure, the clamp 232 (FIG. 6) may be well suited to retain a cylindrical tool body.

Figure 8:
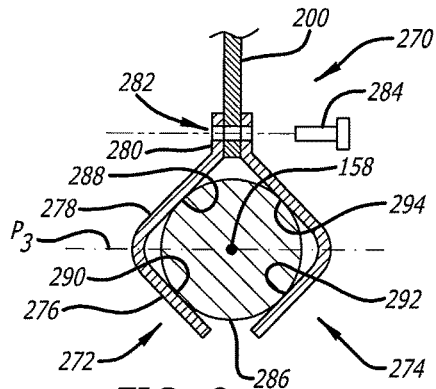
FIG. 8 is an environmental end view of a tool holder of the apparatus illustrated in FIG. 5 according to yet another aspect of the disclosure.

Referring to FIG. 8, in another example, a clamp 270 may include two mirror-image jaws 272, 274. For brevity, only one jaw 272 will be described. The jaw 272 may include a first straight leg 276, a second straight leg 278 oriented, for example, at a right angle to the first straight leg 276, and a tab 280, having a hole 282. The jaws 272, 274 may be coupled to a mounting interface, such as the mounting interface 200, by a fastener 284 in the same way as the clamp 251 illustrated in FIG. 7.

FIG. 8 illustrates the clamp 270 engaging a tool 286 at at least four discrete locations 288, 290, 292, 294. The four discrete locations 288, 290, 292, 294 each include a point in a virtual plane perpendicular to the virtual work axis 158 of the tool, e.g., in the virtual plane $P_2$, shown in FIG. 4. At least one of the at least four discrete locations (e.g., the discrete location 288) is separated from another one of the at least four discrete locations (e.g., the discrete location 290) by a virtual plane, such as the plane $P_3$, which contains the virtual work axis 158 of the tool and is a horizontal plane virtually constructed when the virtual work axis 158 is oriented horizontally. The above-described configuration of clamp 270 enables secure retention of cylindrical or elliptical tool bodies of different diameters within a range of diameters.

An illustrative tool holder, such as the tool holder 207 shown in FIG. 5A, securely retains the tool using at least one clamp that engages the tool essentially continuously around the body of the tool, as depicted, e.g., in FIG. 3. According to another aspect of the disclosure, shown, e.g., in FIG. 9, a tool holder may engage or constrain a tool at at least three discrete locations (e.g., locations 308, 310, 312) around the periphery of the tool, as viewed from a direction along the virtual work axis 158. The term "discrete locations", as used herein, refers to physically separate regions of contact between a clamp and the tool held thereby, where each discrete location or region includes a point in a virtual plane that is perpendicular to the virtual work axis 158. The discrete locations, as used herein, may have different size and shape. As described, for example, with reference to FIG. 9, one of the at least three discrete locations (e.g., the location 308) is separated from another one of the at least three discrete locations (e.g., the location 310) by a virtual plane, such as the plane $P_3$, which contains the virtual work axis 158 of the tool and is a horizontal plane virtually constructed when the virtual work axis 158 is oriented horizontally.

Figure 9:
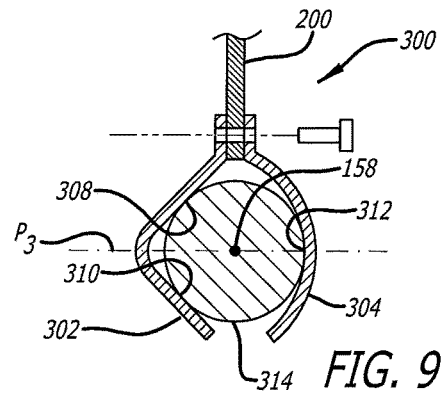
FIG. 9 is an environmental end view of a tool holder of the apparatus illustrated in FIG. 5 according to still another aspect of the disclosure.

In the example of FIG. 9, at least three discrete locations 308, 310, 312 of contact with the periphery of a tool 314 are established by a single clamp 300 including dissimilar jaws 302, 304. The jaws 302, 304 may be coupled to the mounting interface 200 by a fastener 306 in the same or similar manner as the clamp 232, illustrated in FIG. 3. The three discrete locations 308, 310, 312 each include a point in a virtual plane, such as a plane P$_2$ (FIG. 4), perpendicular to the virtual work axis 158. The above-described configuration enables the clamp 300 to accommodate an oval or other non-circular tool body which may not conform readily to the clamps 232 and 270.

Figure 11:
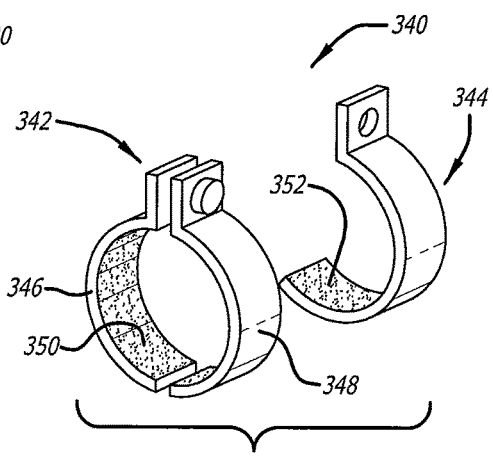
FIG. 11 is a perspective view of another example of a tool holder of the apparatus illustrated in FIG. 5.

In FIG. 11, a clamp 340 may include a first clamp 342 and a second clamp 344, the latter engaging the tool only at the bottom of the tool. The clamp 342 engages the tool at at least three discrete locations. Jaws 346, 348 of the first clamp 342 may be the structural and functional equivalents of the jaws 236, 238 of the clamp 232, illustrated in FIG. 6. The first clamp 342 and the second clamp 344 provide distributed support of the tool relative to the mounting interface 203.

FIG. 11 further illustrates non-marring tool contact surfaces 350, 352, which may be provided for only one clamp 342, or for both of the clamps 342, 344, as shown. The non-marring tool contact surfaces 350, 352 may be soft and conforming. Examples of materials from which non-marring tool contact surfaces are made may include a lining of a woven fabric or fabric-like material, a non-woven natural material, such as cotton batting, a non-woven synthetic material such as polymeric batting, an elastic material such as a natural or synthetic rubber silicone material, a deformable material, such as the pile of either or both of hook and loop fastening material, any combination of these, and still others. Non-marring tool contact surfaces, such as the contact surfaces 350, 352, may optionally be provided for any clamp described herein.

Figure 12:
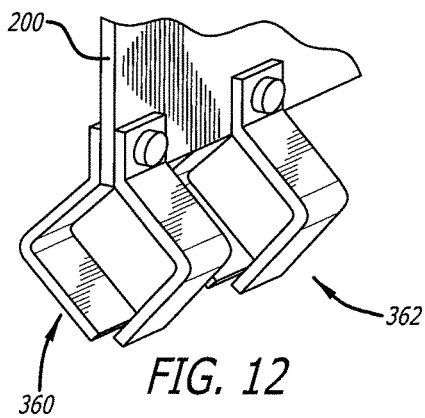
FIG. 12 is a perspective view of yet another example of a tool holder of the apparatus illustrated in FIG. 5.

FIG. 12 shows clamps 360, 362 each capable of engaging the tool at four discrete locations, similar to the clamp 270, illustrated in FIG. 8. Each of the clamps 360, 362 may be the structural and functional equivalents of the clamp 270 of FIG. 8. As in the example of FIG. 11, clamps 360, 362 provide distributed support of the tool relative to the mounting interface 203. Clamps 360, 362 also enable secure retention of cylindrical or elliptical tool bodies of different diameters within a range of diameters.

Figure 10:
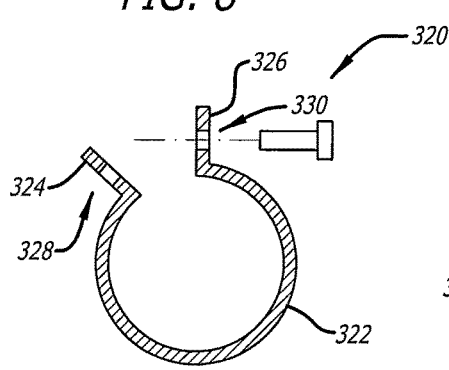
FIG. 10 is an end view of a tool holder of the apparatus illustrated in FIG. 5 according to still yet another aspect of the disclosure.

In the examples of FIGS. 6, 7, 8, and 9, the respective clamps 232, 251, 270 and 300 each include two jaws which are separable from one another. According to another aspect of the disclosure, and as illustrated in FIG. 10, a clamp 320 may be a single member 322, which performs the functions of the two jaws of the clamps 232, 251, 270, and 300. The member 322 may be configured as a band capable of substantially entirely surrounding a tool, such as the tool 150 (FIG. 3). At a minimum, the band, such that the clamp 320, may encircle or surround more than half of the periphery of the tool, and is capable of grasping the tool securely, without requiring an additional mating clamp. The clamp 320 may be coupled with an associated mounting interface, such as the mounting interface 200, in the same way as the clamps 232, 251, 270, and 300.

Figure 13:
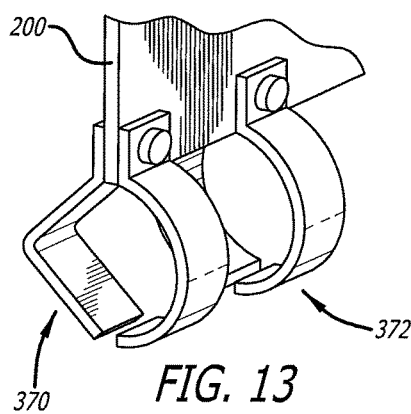
FIG. 13 is a perspective view of still another example of a tool holder of the apparatus illustrated in FIG. 5.

FIG. 13 illustrates an example of a tool holder wherein a first clamp 370 is dissimilar to a second clamp 372. In one or more aspects of the disclosure, either of the first clamp 370 or the second clamp 372 may be the structural and functional equivalent of any clamp previously described herein.

The various combinations and styles of dissimilar clamps, such as the clamps 232, 251, 270, and 300, or jaws of these clamps 232, 251, 270, and 300, may be selected to accommodate different tools and differing models of otherwise similar tools.

According to a further aspect of the disclosure, the mounting interface, such as the mounting interface 200, may used in a variety of ways. FIG. 5 shows the mounting interface 200 as utilized with two clamps 232, 234. In one variation, the mounting interface 200 may be utilized with only one clamp 232, as illustrated in FIG. 14.

According to still another aspect of the disclosure, the mounting interface 203 (FIG. 5A) may be alternatively configured. FIGS. 15 and 16 illustrate a mounting interface 400 which may be utilized with one clamp 402 (FIG. 15) or with two clamps 402, 404 (FIG. 16). The mounting interface 400 may have a single opening 406 at the top for engagement with the support arm 152, as well as an arrangement of openings 408, 41Q, 412, 414, 416 located proximate the bottom of the mounting interface 400. The mounting interface 400 is easier to manufacture compared to the mounting interface 200 illustrated in FIG. 5, while still accommodating either one or two clamps 402, 404.

The selectable locations provided by the holes 202, 204, 206, 208, 210, and 212, 214, 216, 218, 220 (FIG. 3) may take the form of structures other than circular through holes. Although not shown, the selectable locations may include blind grooves extending along a mounting interface, such as the mounting interface 200. Such grooves could be employed, for example, to receive setscrews (not shown).

Holes 202, 204, 206, 208, 210, and 212, 214, 216, 218, 220 need not be circular. One or more holes could have, e.g., keyhole configurations (not shown) or may include other deviations from circular. In other aspects, one or more holes may be oval, elliptical, or otherwise non-circular (not shown).

In the example of FIG. 5, the openings in the mounting interface 200 are holes. In other examples, a slot or slots may be utilized in lieu of or together with one or more holes 212, 214, 216, 218, 220. The purpose of a slot is to enable fine adjustment of the location of the tool holder 207 relative to the mounting interface 203 along the virtual work axis 158. Once the position of the tool holder within the slot is adjusted, a fastener or fasteners may be tightened or deployed to secure the tool holder in that selected position.

FIG. 17 shows a mounting interface 450, including a hole 452 located proximate the top edge of the mounting interface 450, and a slot 454 located proximate the bottom edge of the mounting interface 450. The slot 454 enables a wide range of continuous, rather than incremental or discrete, repositioning of a clamp 456 along the mounting interface 450. The mounting interface 450 may be utilized with two or more clamps, such as clamps 360 and 362, as illustrated e.g., in FIG. 12.

Where two clamps are to be employed, the arrangement of openings for engaging a tool holder, such as the tool holder 207 of FIG. 5A, may include at least one hole and also at least one slot. As shown in FIG. 21, an illustrative mounting interface 480 includes a hole 482 for engaging a support arm, such as the support arm 152 (FIG. 3), a hole 484 located proximate the bottom edge of the mounting interface 480, and a slot 486 located proximate the bottom edge of the mounting interface 480. The hole 484 positively locates a clamp 488 relative to the mounting interface 480 by constraining a fastener 490 of the clamp 488 in a single location along a virtual work axis 158 (FIG. 3) of the tool being retained by the clamp 488. A second clamp 494 may be adjustably positioned in the slot 486. The mounting interface 480 is capable of adjustably engaging a variety of tools by providing fine adjustment of the second clamp 494 using the slot 486.

Referring to FIG. 22, an illustrative mounting interface 500 may include a first arrangement of openings including holes 502, 504, 506, 508, 510 proximate the top edge of the mounting interface 500, for selectively engaging an element of the support arm. The mounting interface 500 may include a second arrangement of openings, including, for example, a hole 512 and a slot 514. The hole 512 may positively locate a clamp 516 relative to the mounting interface 500. The slot 514 may enable selective positioning of a clamp 518 relative to the mounting interface 500. The holes 502, 504, 506, 508, 510 deliver additional positioning options for coupling the mounting interface 500 to a support arm, such as the support arm 152, illustrated in FIG. 3.

FIG. 23 shows an illustrative mounting interface 520 including a hole 522, located proximate the top edge of the mounting interface 520, for engaging the support arm. The mounting interface 520 may have two slots 524, 526 proximate the bottom edge of the mounting interface 520, for receiving respective clamps 528, 530. Because the two slots include a rigidifying bridge therebetween, the mounting interface 520 is stiffer than the mounting interface 450 illustrated in FIG. 18, yet still accommodates adjustable engagement of the clamps therewith.

In another aspect of the disclosure, FIG. 24 shows a mounting interface 540 including holes 542, 544, 546, 548, 550, proximate the top edge thereof, and two slots 552, 554 proximate the bottom edge of the mounting interface 540. The holes 542, 544, 546, 548, 550 provide plural mounting locations for selectively engaging a support arm, such as the support arm 152, illustrated in FIG. 3. The slots 552, 554 may each adjustably engage a respective clamp 556, 558. The mounting interface 540 provides greater adjustability than the mounting interface 520 illustrated in FIG. 23.

Another aspect of the present disclosure relates to a method of suspending a tool (e.g., the tool 150 in FIG. 3), having a center of gravity (e.g., the center of gravity 160 in FIG. 4), from a support arm (e.g., the support arm 152 in FIG. 3) having a mounting location (e.g., the mounting location 162). The method includes coupling the tool 150 to the support arm 152, and horizontally adjusting the center of gravity relative to the mounting location 162. Horizontally adjusting the center of gravity 160 causes the tool 150 to be suspended in a selected orientation with respect to the virtual work axis 158. In the example of FIG. 4, this orientation is horizontal.

In an example of the method, horizontally adjusting the center of gravity 160 relative to the mounting location 162 further includes positioning the center of gravity 160 in substantial vertical alignment with the mounting location 162. This may be accomplished, for example, by selecting one of the holes 212, 214, 216, 218, or 220 when engaging one or more clamps, such as the clamps 232, 234, with the mounting interface. In the example of FIG. 4, positioning the center of gravity in substantial vertical alignment with the mounting location causes the work axis 158 to be horizontal.

In an alternative, coupling the tool 150 to the support arm 152 in the method includes clamping the tool 150.

In a variant of the method, coupling the tool 150 to the support arm 152 includes constraining the tool 150 at at least three discrete locations (e.g., the discrete locations 308, 310, 312 illustrated in FIG. 9) about a periphery of the tool 150. Distribution of discrete locations 308, 310, 312 about the periphery of the tool 150 causes the tool to be effectively retained by the tool holder, such as the illustrative clamp 300.

In an alternative, and with reference to FIGS. 4 and 9, with a virtual work axis of the tool (such as the virtual work axis 158) oriented horizontally, in the method, a horizontal virtual plane (such as the plane $P_3$ in FIG. 4) containing the virtual work axis (e.g. the virtual work axis 158) lies between one of at least three discrete locations (such as the discrete locations 308, 310, 312 illustrated in FIG. 9), and another one of the at least three discrete locations 308, 310, 312. Each one of the at least three discrete locations 308, 310, 312 includes a point in a virtual plane $P_2$ (see FIG. 4), perpendicular to the virtual work axis 158. The above-described configuration of the tool holder 207 (FIG. 5A) ensures the effective grasp of the tool 150 by the tool holder (e.g., the clamp 300 of FIG. 9).

In a further example of the method, coupling the tool (e.g., the tool 150, FIG. 4) to the support arm (e.g., the support arm 152) includes constraining the tool at at least four discrete locations about a periphery of the tool. In the example of FIG. 8, four discrete locations 288, 290, 292, 294 are illustrated, each including a point in a virtual plane perpendicular to the virtual work axis 158, such as the plane $P_2$, illustrated in FIG. 4. Constraining the tool 150 at at least four discrete locations about its periphery enhances the effective grasp of the tool by the tool holder, such as, for example, the clamp 270 of FIG. 8.

In another variant of the method, constraining the tool (e.g., the tool 286 in FIG. 8) may include not only constraining the tool 286 at at least four discrete locations, such as the discrete locations 288, 290, 292, 294 in FIG. 8, about the periphery of the tool, but also at at least four additional discrete locations. In the example of FIG. 12, two clamps 360, 362, which are structural and functional equivalents of the clamp 270 of FIG. 8, collectively provide at least eight discrete locations for engaging the tool, distributed in two virtual planes (such as the plane $P_2$ of FIG. 4) perpendicular to the virtual work axis 158. The four additional discrete locations provided by the second clamp (e.g., the clamp 362 in FIG. 12) further increase effectiveness of a tool holder (e.g., the tool holder 207 of FIG. 5A) in holding a tool, such as the tool 286 of FIG. 8, compared to a tool holder having only four discrete locations (e.g., the clamp 270) for engaging the tool.

In another example of the method, constraining the tool (e.g., the tool 314 of FIG. 9) at at least three discrete locations (e.g., the discrete locations 308, 310, 312 in FIG. 9) further includes constraining the tool at at least three additional discrete locations. An example of constraining the tool in this manner could be achieved using two clamps, such as the clamp 300 of FIG. 9, each providing three discrete locations for engaging the tool. The three additional discrete locations provided by the second clamp (e.g., the clamp 300) for engaging the tool further increase effectiveness of a tool holder (e.g., the tool holder 207 of FIG. 5A) in holding a tool, such as the tool 314 of FIG. 9, compared to a tool holder having only three discrete locations (e.g., the clamp 300) for engaging the tool.

In another variant of the method and with reference to FIGS. 9 and 12, with the virtual work axis 158 of the tool (e.g., the tool 314) oriented horizontally, a horizontal virtual plane (such as the plane $P_3$ of FIG. 3) containing the virtual work axis 158 of the tool 314 lies between one of the three additional discrete locations of the second clamp of FIG. 12, and another one of the at least three additional discrete locations. The above-described configuration of the tool holder 207 (FIG. 5A) ensures the effective grasp of the tool 150 by the tool holder (for example, two clamps, such as the clamp 300 of FIG. 9).

In an alternative of the method, coupling the tool (such as the tool 150 of FIG. 3) to the support arm (e.g., the support arm 152) further includes coupling the tool 150 to a mounting interface (e.g., the mounting interface 200) intermediate the support arm 152 and a tool holder. In FIG. 3, the tool holder is provided by the clamps 232 and 234. Referring to FIG. 4, coupling the tool 150 to the mounting interface 200 enables, for example, the center of gravity 160 of the tool 150 to be selectively and adjustably positioned below the mounting location 162 of the support arm 152 in substantial vertical alignment therewith when the support arm 152 engages the mounting interface 200 and when the clamps 232 and 234 (FIG. 3) engage the tool and the mounting interface 200.

In a variant of the method, coupling the tool (such as the tool 150 of FIG. 3) to the support arm (such as the support arm 152) further includes coupling the support arm 152 to the mounting interface, such as the mounting interface 200.

In still another example of the method, horizontally adjusting the center of gravity (e.g., the center of gravity 160 of FIG. 4) relative to the mounting location, such as the mounting location 162 (FIG. 4) includes horizontally displacing the tool 150 relative to the mounting interface, such as the mounting interface 200.

In yet another alternative of the method, horizontally adjusting the center of gravity 160 (FIG. 4) relative to the mounting location 162 further includes horizontally displacing the mounting interface (e.g., the mounting interface 200) relative to the support arm 152.

In some cases, holes which are shown as through holes, such as the holes 212, 214, 216, 218, 220 in FIG. 4, may be realized as blind holes. The same may apply to slots, such as the slot 454, illustrated in FIG. 17. Where blind holes or blind slots are provided, clamps (e.g., the clamps 232, 234 of FIG. 3) may engage the mounting interface associated with the blind holes or blind slots, such as by setscrews or by other encircling or clamping features (not shown).

Holes, such as holes 202, 204, 206, 208, 210, of the mounting interface 200 illustrated in FIG. 3, may be provided in any desired number.

Holes, such as the holes 202, 204, 206, 208, 210, may be of different effective diameters. Similarly, slots, such as the slot 454 illustrated in FIG. 17, may have different and/or variable widths (not shown). In some examples, such slots may not be parallel to the virtual work axis 158. In some aspects, slots may be arcuate along their full or partial extent (not shown).

The terms "example", "variant", and "alternative" hereinabove are used interchangeably.

Many modifications and other examples of the disclosure set forth herein will come to mind to one skilled in the art to which these disclosure pertain having the benefit of the presented in the foregoing descriptions and the associated drawings. Therefore, it is to be understood that the disclosures are not to be limited to the specific examples disclosed and that modifications and other examples are intended to be included within the scope of the appended claims. Moreover, although the foregoing descriptions and the associated drawings describe examples in the context of certain illustrative combinations of elements and/or functions, it should be appreciated that different combinations of elements and/or functions may be provided by alternative implementations without departing from the scope of the appended claims.

What is claimed is:

1. An apparatus for suspending a tool, the apparatus comprising:
    a support arm having a single mounting location;
    clamps, configured to collectively engage the tool; and
    a mounting interface, configured to extend substantially along a work axis of rotation of the tool,
        wherein the mounting interface is a rigid planar element that comprises:
            a first plurality of selectable locations configured to provide direct pivotal adjustable engagement of the single mounting location of the support arm with the mounting interface, and
            a second plurality of selectable locations, spatially fixed relative to the first plurality of selectable locations and configured to provide adjustable engagement of the clamps with the mounting interface,
    wherein,
        when the clamps are engaged with the mounting interface, but not engaged with the tool, each of the clamps is pivotable relative to the mounting interface, and
        when the clamps are engaged with the mounting interface and engaged with the tool, the clamps are not pivotable relative to the mounting interface,
        when the work axis of rotation of the tool lies in a virtual vertical plane and in a virtual horizontal plane, and when the support arm pivotally engages the mounting interface, and when the clamps engage the mounting interface and the tool:
            at least one surface of the mounting interface is parallel to the virtual vertical plane, and
            the virtual horizontal plane does not pass through the mounting interface, and
        when the mounting interface pivots relative to the single mounting location of the support arm, the work axis of rotation of the tool always remains in the virtual vertical plane.

2. The apparatus of claim 1, wherein the first plurality of selectable locations and the second plurality of selectable locations are configured to provide a center of gravity of the tool to be selectively and adjustably positioned below the single mounting location in substantial vertical alignment therewith when the single mounting location of the support arm directly and pivotably engages the mounting interface and when the clamps engage the tool and the mounting interface.

3. The apparatus of claim 1, wherein the mounting interface is directly and pivotally engaged by the single mounting location of the support arm so that the mounting interface is parallel to or coincident with the virtual vertical plane.

4. The apparatus of claim 1, wherein each of the first plurality of selectable locations and the second plurality of selectable locations is arranged substantially along the work axis of rotation of the tool.

5. The apparatus of claim 1, wherein each of the first plurality of selectable locations and the second plurality of selectable locations comprises at least one opening in the mounting interface.

6. The apparatus of claim 5, wherein the at least one opening is a through opening.

7. The apparatus of claim 5, wherein the first plurality of selectable locations and the second plurality of selectable locations comprise multiple openings in the mounting interface.

8. The apparatus of claim 7, wherein the openings comprise a first arrangement of openings located proximate the support arm and a second arrangement of openings located below the first arrangement of openings when the mounting interface is suspended from the support arm.

9. The apparatus of claim 8, wherein the single mounting location of the support arm is connected to the mounting interface at one of the openings of the first arrangement of openings.

10. The apparatus of claim 8, wherein at least one of the first arrangement of openings comprises a hole.

11. The apparatus of claim 8, wherein the second arrangement of openings comprises a hole and a slot.

12. The apparatus of claim 1, wherein at least one of the clamps comprises a band which surrounds the tool about more than half of a periphery of the tool when the at least one of the clamps engages the tool.

13. The apparatus of claim 1, wherein at least one of the clamps comprises a non-marring tool contact surface.

14. The apparatus of claim 1, wherein at least one of the clamps is adapted to engage the tool at at least three discrete locations about a periphery of the tool, wherein each of the at least three discrete locations includes a point in a third virtual plane perpendicular to the virtual vertical plane and the virtual horizontal plane, and one of the at least three discrete locations is separated from another one of the at least three discrete locations by the virtual horizontal plane.

15. The apparatus of claim 1, wherein at least one of the clamps comprises a fastener configured to secure the tool within the at least one of the clamp and also to secure the tool relative to the mounting interface.

16. The apparatus of claim 1, wherein each of the clamps comprises two opposed jaws.

17. The apparatus of claim 16, wherein at least one of the two opposed jaws comprises an arcuate member configured to mate with a circumferential surface of the tool.

18. The apparatus of claim 16, wherein the two opposed jaws are separable from one another.

19. The apparatus of claim 1, wherein at least one of the clamps comprises a fastener configured to secure the tool within the at least one of the clamps and also to pivotally secure the at least one of the clamps relative to the mounting interface.

20. The apparatus of claim 19, wherein at least one of the clamps and the mounting interface are configured to be joined by the fastener passing through the at least one of the clamps and the mounting interface.

21. The apparatus of claim 1, wherein the support arm is substantially parallel to the work axis of rotation of the tool.

\* \* \* \* \*